United States Patent
Swales et al.

(10) Patent No.: US 9,469,186 B2
(45) Date of Patent: Oct. 18, 2016

(54) DRIVETRAIN FOR A GROUND VEHICLE

(71) Applicant: GM GLOBAL TECHNOLOGY OPERATIONS LLC, Detroit, MI (US)

(72) Inventors: Shawn H. Swales, Canton, MI (US); Ionel I. Zanoaga, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 201 days.

(21) Appl. No.: 14/448,316

(22) Filed: Jul. 31, 2014

(65) Prior Publication Data
US 2016/0031310 A1 Feb. 4, 2016

(51) Int. Cl.
| | |
|---|---|
| *B60K 6/36* | (2007.10) |
| *B60K 6/40* | (2007.10) |
| *B60K 6/52* | (2007.10) |
| *B60K 17/354* | (2006.01) |
| *F01M 11/00* | (2006.01) |
| *B60K 6/48* | (2007.10) |
| *B60K 1/00* | (2006.01) |
| *B60K 17/356* | (2006.01) |

(52) U.S. Cl.
CPC . *B60K 6/52* (2013.01); *B60K 6/40* (2013.01); *B60K 6/48* (2013.01); *B60K 17/354* (2013.01); *F01M 11/0004* (2013.01); *B60K 1/00* (2013.01); *B60K 17/356* (2013.01); *B60K 2001/001* (2013.01); *F01M 2011/0066* (2013.01); *Y02T 10/6221* (2013.01); *Y02T 10/6265* (2013.01); *Y10S 903/905* (2013.01)

(58) Field of Classification Search
CPC ...... B60K 5/02; B60K 17/356; B60K 6/365; B60K 6/52; B60K 6/54; B60K 6/36; B60K 6/40; F16H 48/06; F16H 2702/00
USPC ........ 180/242, 243, 69.1, 65.21, 65.22, 292; 475/248; 123/95 R
See application file for complete search history.

(56) References Cited

U.S. PATENT DOCUMENTS

| | | | | |
|---|---|---|---|---|
| 1,717,784 | A * | 6/1929 | Johnson | F16H 48/10 475/174 |
| 2,737,829 | A * | 3/1956 | Wilson | B60K 17/046 180/371 |
| 3,052,313 | A * | 9/1962 | Hooven | B60K 5/02 180/254 |
| 3,213,958 | A * | 10/1965 | Muller | B60K 5/02 180/254 |
| 3,528,323 | A * | 9/1970 | Kamlukin | F16H 48/10 475/235 |
| 5,065,831 | A * | 11/1991 | Murakami | B60K 17/16 180/292 |
| 6,059,064 | A * | 5/2000 | Nagano | B60K 6/44 180/243 |
| 7,762,366 | B2 * | 7/2010 | Janson | B60K 6/365 180/65.6 |
| 8,011,341 | B2 | 9/2011 | Iida | |
| 8,151,757 | B2 * | 4/2012 | Huenink | B62D 21/11 123/195 A |
| 8,479,851 | B2 * | 7/2013 | Mack | H02K 7/003 180/65.1 |
| 8,833,329 | B2 * | 9/2014 | Kasuga | B60K 5/04 123/195 A |
| 2007/0093344 | A1 * | 4/2007 | Kira | B60K 6/36 475/150 |
| 2013/0143706 | A1 | 6/2013 | Holmes et al. | |
| 2013/0203548 | A1 | 8/2013 | Mellet et al. | |
| 2014/0141922 | A1 | 5/2014 | Biermann et al. | |

* cited by examiner

*Primary Examiner* — Anne Marie Boehler
(74) *Attorney, Agent, or Firm* — Quinn Law Group, PLLC

(57) ABSTRACT

A drivetrain providing tractive torque to a ground vehicle includes a non-combustion torque machine coaxial to and rotatably coupled to an integrated gear set including a conjoined carrier assembly coupling a reducing gear set to a differential gear set. The differential gear set is coaxial to and rotatably coupled to first and second differential axle members. The first differential axle member couples to a first wheel assembly of the ground vehicle and the second differential axle member couples to a second wheel assembly located on a second, opposite side of the ground vehicle.

16 Claims, 4 Drawing Sheets

DRIVETRAIN FOR A GROUND VEHICLE

TECHNICAL FIELD

The disclosure relates to a drivetrain for a ground vehicle.

BACKGROUND

The statements in this section merely provide background information related to the present disclosure and may not constitute prior art.

Developers of drivetrains for ground vehicles seek to provide devices and systems that meet requirements and constraints related to performance, weight, packaging and durability, among others.

SUMMARY

A drivetrain providing tractive torque to first and second wheel assemblies of a ground vehicle includes a non-combustion torque machine coaxial to and rotatably coupled to an integrated gear set including a conjoined carrier assembly coupling a reducing gear set to a differential gear set. The differential gear set is coaxial to and rotatably coupled to first and second differential axle members. The first differential axle member coupled to the first wheel assembly arranged on a first side of the ground vehicle and the second differential axle member couples to the second wheel assembly arranged on a second, opposite side of the ground vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
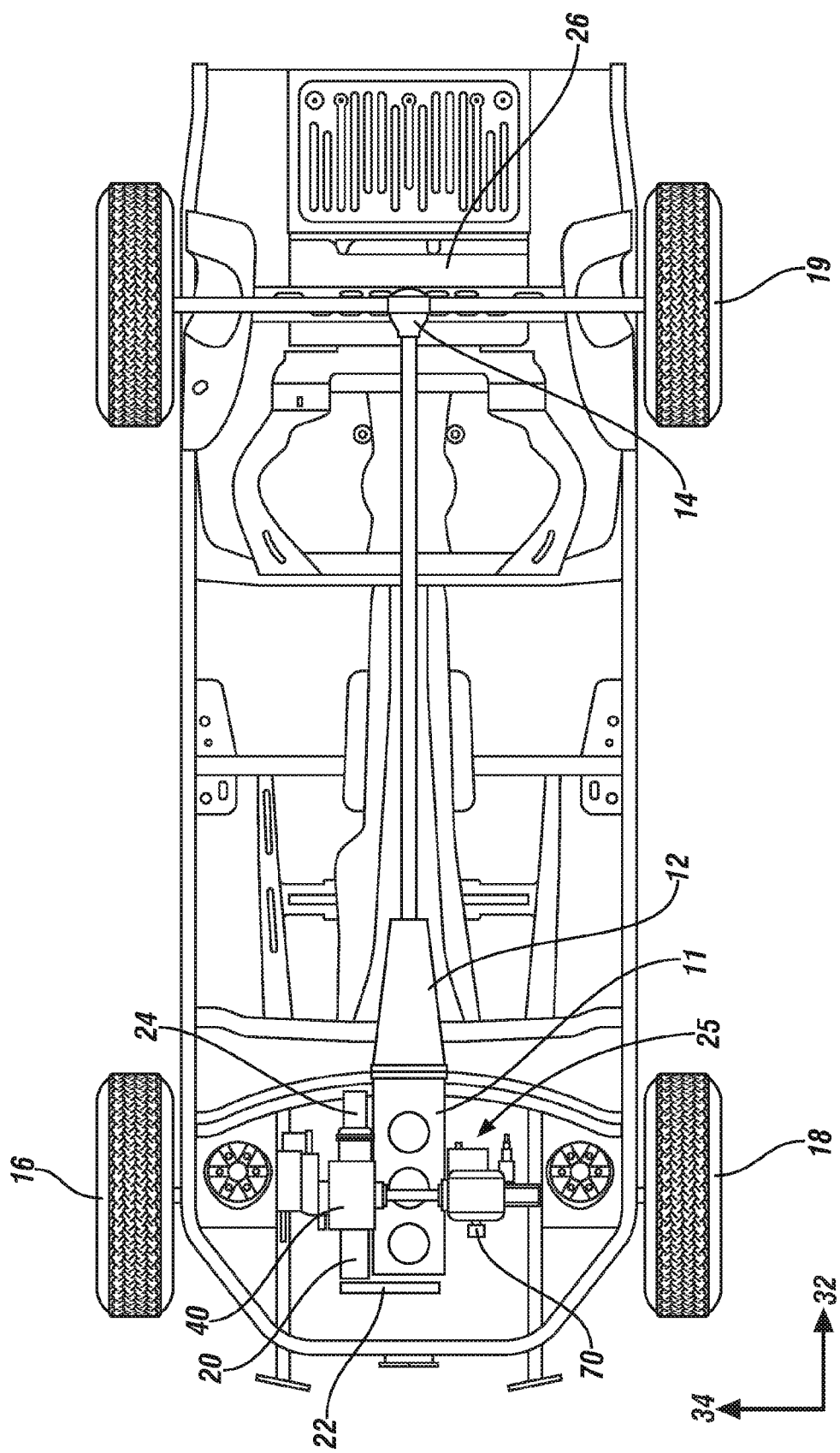
FIG. 1 schematically illustrates a bottom view of a ground vehicle including first and second drivetrains to generate tractive torque, in accordance with the disclosure.

Referring now to the drawings, wherein the depictions are for the purpose of illustrating certain exemplary embodiments only and not for the purpose of limiting the same, FIG. 1 schematically illustrates a bottom view of a ground vehicle 10 including first and second drivetrains that generate and transfer tractive torque that has been constructed in accordance with an embodiment of this disclosure. A drivetrain is defined as a set of interacting elements that generate and transfer tractive torque to effect vehicle propulsion, and preferably includes torque generative device(s), e.g., an engine and/or a motor, elements that multiply and split torque and speed, rotating members and ground wheel assemblies. The ground vehicle 10 is shown in context of longitudinal and transverse axes 32, 34, respectively, and includes a first drivetrain including a longitudinally-mounted internal combustion engine (engine) 11 in a forward vehicle location coupled to a transmission 12 that couples through a driveshaft and a differential gear 14 to rear vehicle wheels 19 via rear axles. The ground vehicle 10 includes a second drivetrain 25 including a first high-voltage electrically-powered motor/generator (motor) 40 that generates torque that can be transferred to first and second front wheels 16, 18 through an integrated reduction-differential gearset 70. In one embodiment, the engine 11 couples to a second high-voltage electrically-powered motor/generator (motor) 20 through a belt-drive mechanism 22 to effect autostop and autostart engine operation. In one embodiment (not shown) the first motor 40 couples to the integrated reduction-differential gearset 70 to generate torque that can be transferred to first and second front wheels 16, 18 and couples to the belt-drive mechanism 22 to effect autostop and autostart engine operation.

An inverter 24 electrically transforms electric power originating from a high-voltage electrical energy storage device 26 to power the first motor 40 and the second motor 20 when employed. In one embodiment, the second drivetrain 25 provides supplemental tractive torque for the ground vehicle 10 that provides all-wheel drive (AWD) capability and electric-hybrid operation, including providing both acceleration torque and regenerative braking torque. The second drivetrain 25 is described with the first motor 40 configured as an electrically-powered motor/generator, but it is understood that other suitable non-combustion torque machines, including, e.g., hydraulic torque machines and pneumatic torque machines may be employed with similar effect within the scope of this disclosure.

Figure 2:
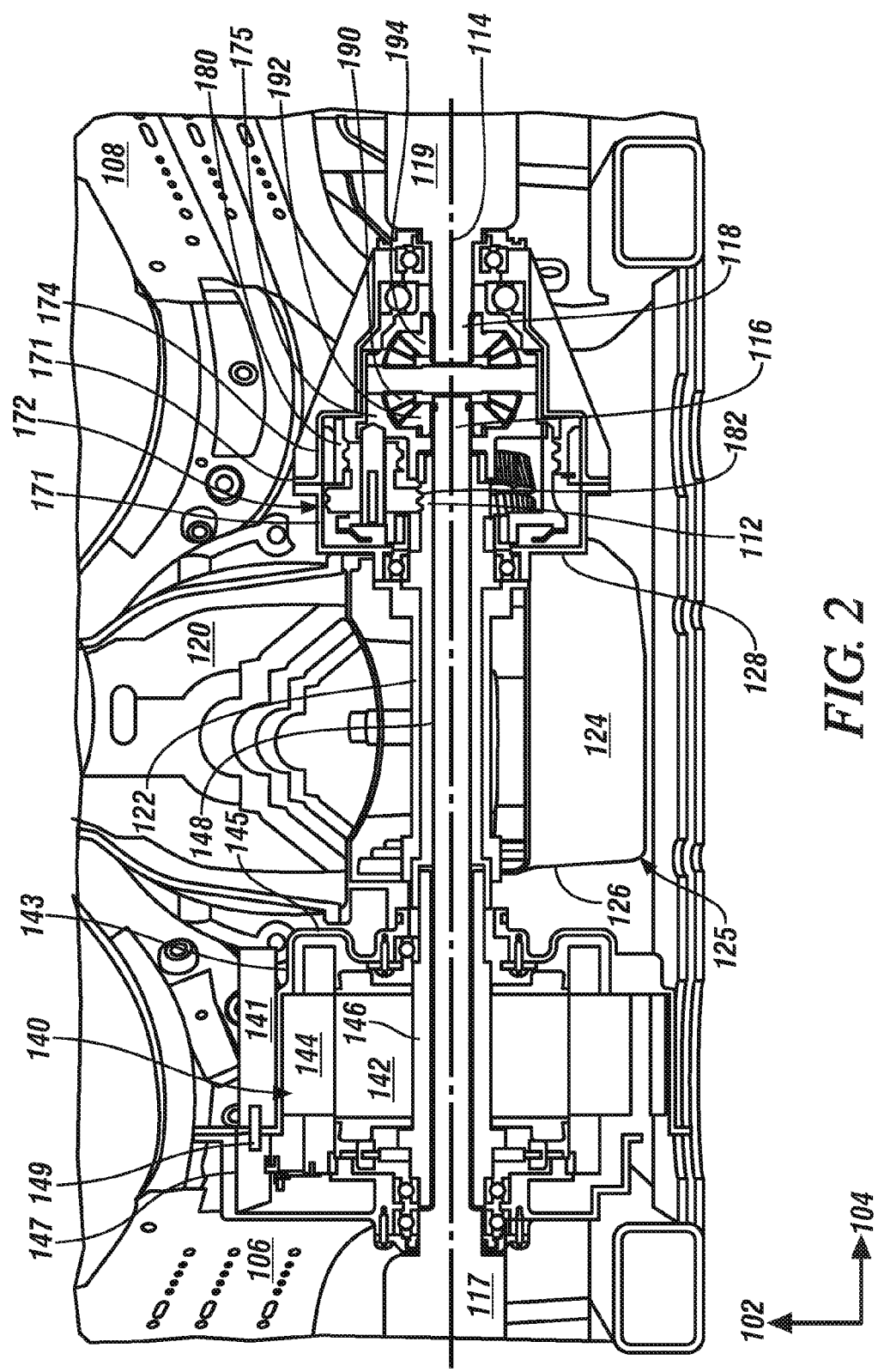
FIG. 2 schematically illustrates a cross-sectional view of a front portion of a ground vehicle looking rearward and showing an embodiment of a second drivetrain, in accordance with the disclosure.

FIG. 2 schematically shows a cross-sectional view of a front portion of a ground vehicle 100 looking rearward, with the cut-away view executed in a vertical orientation through a longitudinally-mounted engine 120 at a front axle location. Vertical and transverse axes 102 and 104, respectively, are shown, as are a first side 106 and a second, opposite side 108 of the ground vehicle 100. Elements of a drivetrain 125 for providing tractive torque to the ground vehicle 100 are shown, wherein the drivetrain 125 is analogous to the second drivetrain 25 shown in FIG. 1. The drivetrain 125 includes a high-voltage electrically-powered motor/generator (motor) 140 that rotatably couples to first and second wheel assemblies 117 and 119, respectively, via an integrated gear set 170 using a plurality of rotating members as described herein. The motor 140, the integrated gear set 170 and the first and second wheel assemblies 117 and 119 are coaxially arranged in an inline configuration along an in-line axis 114 that is parallel with the transverse axis 104 of the ground vehicle 100.

The engine 120 is a multi-cylinder longitudinally-mounted internal combustion engine with cylinders arranged in an inline configuration, although the disclosure is not so limited. The engine 120 includes an oil pan 124 fixedly attached to an underside of an engine block to retain lubricating oil, provide a sump for an engine oil pump, and provide mechanical covering of a rotating crankshaft of the engine 120. The oil pan 124 includes a first vertical side 126 and a second vertical side 128, wherein the motor 140 is located adjacent to the first vertical side 126 and the integrated gear set 170 is located adjacent to the second vertical side 128. The oil pan 124 includes a cylindrically-shaped hollow tube 122 having a longitudinal axis that is coaxial to the in-line axis 114. The hollow tube 122 is fabricated to pass through the oil pan 124 from the first vertical side 126 to the second vertical side 128, and is configured to accommodate rotatable torque transfer members including a tubular intermediate motor member 148 concentric to a first differential axle shaft 118, each having an axis of rotation coaxial with the in-line axis 114. Other features of the oil pan 124 are described herein.

The motor 140 is any suitable electrically-powered multi-phase machine that is capable of both motor and generator operations, including, e.g., an induction motor, a synchronous motor or a permanent magnet motor. Alternatively, the motor 140 is one of a hydraulically-powered torque machine or a pneumatically-powered torque machine. The motor 140 includes a stator 144 and a rotor 142 retained in a housing 145. The rotor 142 couples to a tubular motor member 146 and both have an axis of rotation coaxial to the in-line axis 114. In one embodiment, the housing 145 is an assembled clamshell configuration having an inboard, engine-side portion 143 and an outboard, wheel-side portion 147. In one embodiment, the inboard portion 143 of the housing 145 for the motor 140 is fabricated onto the first vertical side 126 of the oil pan 124. The outboard, wheel-side portion 147 of the housing 145 preferably incorporates a structural lug 149 that mechanically couples to a support bracket of a powertrain mount 141. The lug 149 structurally supports at least a portion of the motor 140 to supplement structural support provided by the oil pan 124 to carry at least a portion of motor body forces and reaction loads. The powertrain mount 141 extends horizontally from the engine block and is supported on its distal end to a frame support element in one embodiment.

The integrated gear set 170 assembles on the second vertical side 128 of the oil pan 124 in a gearbox housing 172 that includes an inboard element 171 and an outboard element 174 arranged in a clamshell configuration in one embodiment. The integrated gear set includes a reducing gear set 180 coupled to a differential gear set 190 using a conjoined carrier assembly 175. In one embodiment, an inboard portion 171 of the housing 172 is fabricated onto the second vertical side 128 of the oil pan 124 by integral casting or another suitable fabrication method. Fabricating the inboard portion 171 of the housing 172 onto the second vertical side 128 of the oil pan 124 can eliminate need for a separate part and associated seals and reduces overall axial length of the integrated gear set 170.

The reducing gear set 180 preferably employs a planetary gear reduction configuration to reduce rotational speed and correspondingly increase torque output that is transferred through the conjoined carrier assembly 175 to the differential gear set 190. The differential gear set 190 divides and transfers the torque output to first and second differential axle members 116, 118. Details of one embodiment of the integrated gear set 170 are described with reference to FIG. 3.

A sun gear 182 of the reducing gear set 180 mounts on a tubular member 112, and both rotatably couple to the intermediate motor member 148 via mating splines or other suitable coupling mechanisms.

A first sun gear 192 of the differential gear set 190 rotatably couples to the first differential axle member 116, which is coaxial to the tubular member 112 and the intermediate motor member 148 and passes therethrough to couple with the first wheel assembly 117 to transfer torque thereto. A second sun gear 194 of the differential gear set 190 rotatably couples to the second differential axle member 118, which is coaxial to the first differential axle member 116, the tubular member 112 and the intermediate motor member 148, and couples with the second wheel assembly 119 to transfer torque thereto.

Spline couplings for the intermediate motor member 148 permit it to axially float between the sun gear 182 of the reducing gear set 180 and the tubular motor member 146. This configuration facilitates separate assembly processes for the motor 140 and the integrated gear set 170 and allows tolerance to align the various elements along the in-line axis 114. The rotor 142 is supported with bearings that are independent from bearings for the sun gear 182 of the reducing gear set 180. The intermediate motor member 148 is fabricated with male splines that engage the sun gear 182 of the reducing gear set 180, thus minimizing a required diameter of the hollow tube 122 fabricated through the oil pan 124.

In one alternative embodiment, the drivetrain is configured to include a high-voltage electrically-powered motor/generator (motor) that rotatably couples to first and second wheel assemblies via a differential gear set and a reducing gear set, all of which are coaxially arranged in an inline configuration along an in-line axis that is parallel with the transverse axis of the ground vehicle. In this embodiment the motor and the reducing gear set mount on the first vertical side of the oil pan of the longitudinally mounted internal combustion engine and the differential gear set mounts on the second side of the oil pan. The oil pan includes a cylindrically-shaped hollow tube having a longitudinal axis that is coaxial to the in-line axis through which passes a plurality of coaxial rotating members that rotatably couple the various elements.

Figure 3:
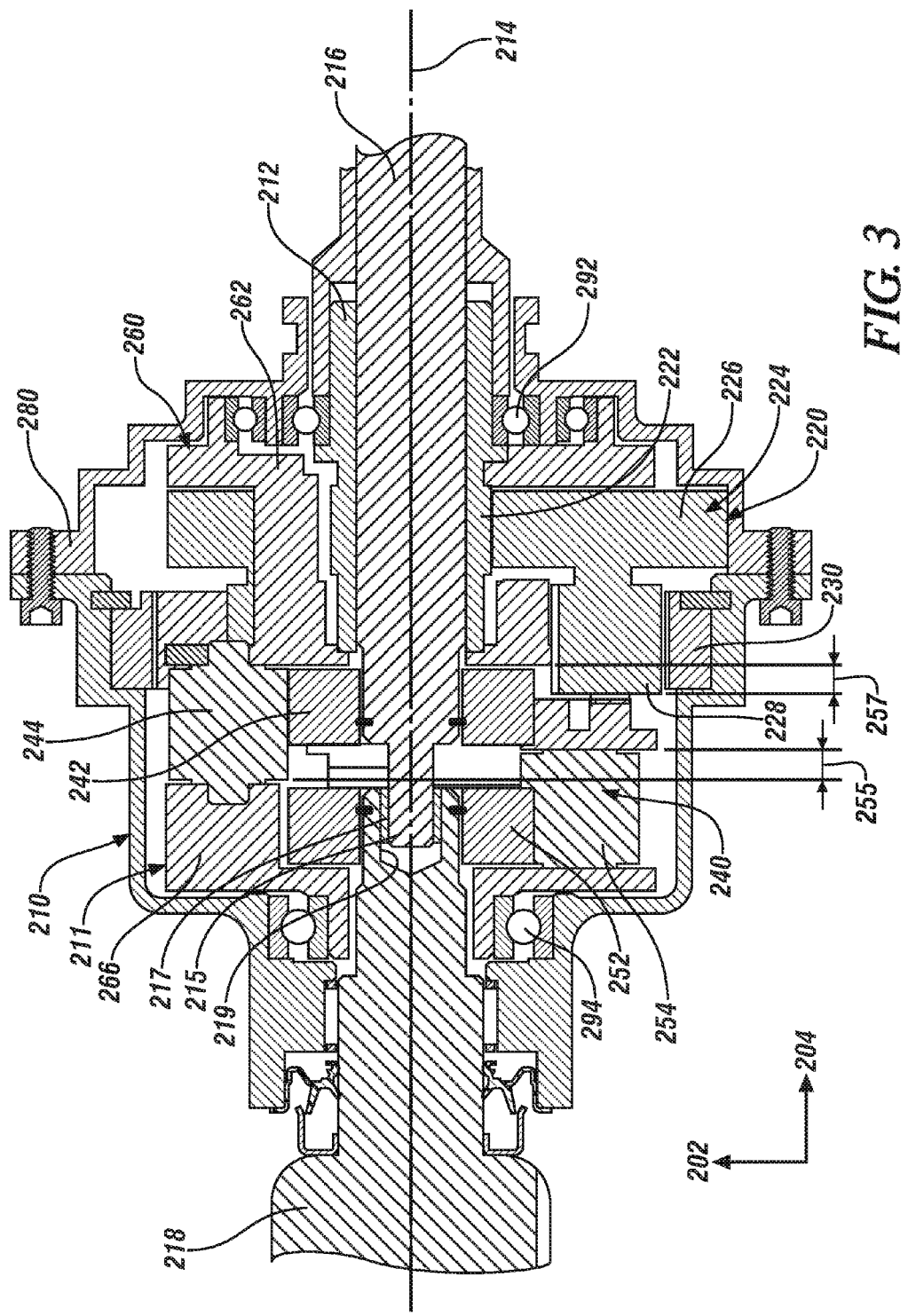
FIG. 3 schematically shows a two-dimensional cutaway drawing of an embodiment of an integrated torque-transfer gear set employed in the second drivetrain, in accordance with the disclosure.

FIG. 3 schematically shows a two-dimensional cross-sectional drawing of an embodiment of the integrated torque-transfer gear set 210 in context of a horizontal axis 204 and a vertical axis 202. When deployed on a ground vehicle, the horizontal axis 204 corresponds to a transverse or lateral direction and the vertical axis 202 corresponds to an elevation direction. A centerline 214 shown parallel to the horizontal axis 204 defines an axis of rotation for elements of the integrated torque-transfer gear set 210 and the vertical axis 202 depicts a radial direction from the centerline 214. The integrated torque-transfer gear set 210 rotatably couples to an input member 212 and first and second output members 216 and 218, respectively. The input member 212 and the first and second output members 216, 218 are preferably coaxial. The input member 212 corresponds to the tubular member 112 described with reference to FIG. 2, and the first and second output members 216, 218 correspond to the first and second differential axle members 116, 118, respectively, described with reference to FIG. 2. The integrated torque-transfer gear set 210 includes an integrated gear assembly 211 that meshingly engages a stationary annular ring gear 230 that fixedly mounts to a housing 280. The integrated gear assembly 211 includes a reducing gear assembly 220 and a differential gear assembly 240 assembled to and rotationally coupled by a conjoined carrier assembly 260, which includes a first carrier element 262 and a coaxial second carrier element 266.

The reducing gear assembly 220 includes a first sun gear 222 meshingly engaging a plurality of stepped pinion gears 224 that meshingly engage the ring gear 230. The first sun gear 222 is coaxial to and rotatably couples to the input member 212. The first sun gear 222 is structurally supported in the conjoined carrier assembly 260 to improve gear alignment therein and to reduce relative speeds and associated spin losses.

The stepped pinion gears 224 each include a first gear element 226 coaxial to and rotatably coupled to a second gear element 228, and rotatably assemble onto the first carrier element 262 using axles and corresponding axle mounts. The first gear elements 226 meshingly engage the first sun gear 222. The second gear elements 228 meshingly engage the ring gear 230. The differential gear assembly 240 includes third and fourth independently rotating pinion gears 244, 254, respectively, that meshingly engage corresponding second and third sun gears 242, 252, respectively. The second and third sun gears 242, 252 are preferably interchangeable. The third and fourth pinion gears 244, 254 are preferably interchangeable. The third pinion gears 244 assemble onto the conjoined carrier assembly 260 between the first carrier element 262 and the second carrier element 266 using axles and corresponding axle mounts. The fourth pinion gears 254 assemble onto the second carrier element 266 of the conjoined carrier assembly 260 using axles and corresponding axle mounts. The first carrier element 262 of the conjoined carrier assembly 260 rotatably mounts into and is supported in the housing 280 using bearing 292. The second carrier element 266 of the conjoined carrier assembly 260 rotatably mounts into and is supported in the housing 280 using bearing 294. The fourth pinion gears 254 of the differential gear set 240 axially overlap the third pinion gears 244 of the differential gear set 240 along the horizontal axis 204, thus reducing axial length, with axial overlapping depicted at 255. The third pinion gears 244 of the differential gear set axially overlap the second gear elements 228 of the stepped pinion gears 224 of the reducing gear set 220, with axial overlapping depicted at 257.

The first output member 216 fixedly couples to the third sun gear 242 and rotates therewith, and the second output member 218 fixedly couples to the fourth sun gear 252 and rotates therewith. An inboard end of the second output member 218 is formed with a hollow bore portion 219 into which a bearing 217 is inserted. An inboard end of the first output member 216 is formed with a projecting portion 215, which inserts into and freely rotates in the bearing 217 of the hollow bore portion 219 of the second output member 218. This arrangement allows the first output member 216 to mechanically support the second output member 218, thus permitting a reduction in axial length of the integrated torque-transfer gear set 210 in the transverse direction.

Figure 4:
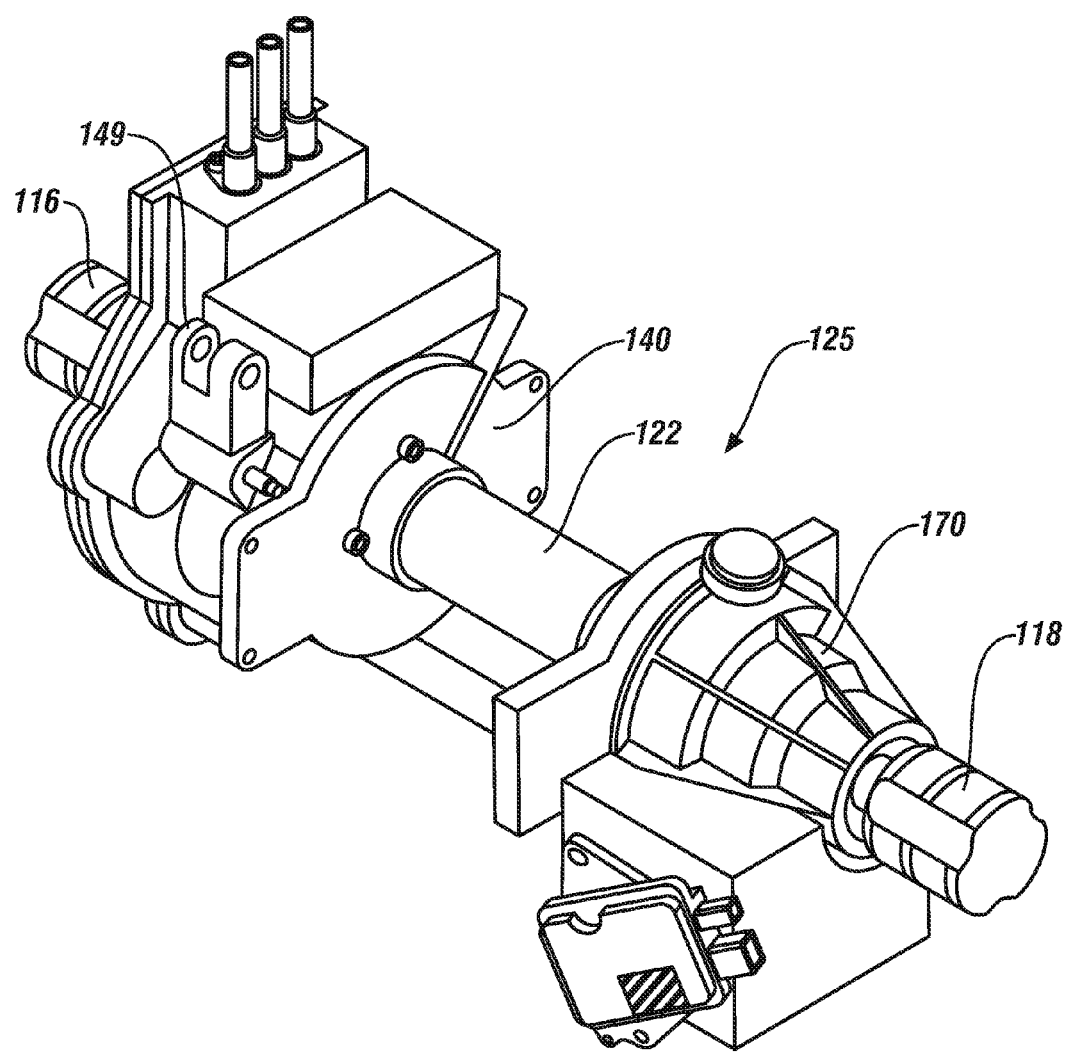
FIG. 4 schematically shows an isometric view of an embodiment of the second drivetrain, in accordance with the disclosure.

FIG. 4 schematically shows an isometric view of an embodiment of the second drivetrain 125 for providing tractive torque to a ground vehicle, including the high-voltage electrically-powered motor/generator (motor) 140, the cylindrically-shaped hollow tube 122 fabricated to pass through the oil pan (not shown), and integrated gear set 170. The outboard, wheel-side portion of the housing 145 of motor 140 incorporates a structural lug 149 that mechanically couples to a support bracket of engine 120 mount (shown in FIG. 2). The lug 149 structurally supports at least a portion of the motor 140 to supplement structural support provided by the oil pan to carry at least a portion of motor body forces and reaction loads. Thus, the outboard end of the motor 140 physically connects to the powertrain mount, thereby short-circuiting a structural path that would otherwise pass from the motor housing to the oil pan to the engine block to the mount, and reducing a need for increased structural integrity of those components to mechanically support the motor 140. The first and second differential axle members 116, 118 transfer torque between the motor 140 and first and second wheel assemblies (not shown).

The foregoing description of the second drivetrain facilitates packaging of an electric or other non-combustion drive unit in a front, underhood compartment employing an oil pan-axle arrangement with concentric shafts passing through the engine oil pan, an integrated gear set including a conjoined carrier assembly coupling a reducing gear set to a differential gear set, a compact shaft bearing arrangement including an inter-axle bushing and a sun shaft bearing in the carrier assembly, and integration of inboard housings for the motor and/or the integrated gear set into the oil pan to reduce axial length along the transverse width of the vehicle. A floating shaft arrangement facilitates assembly of the second drivetrain into the front engine assembly. The integration of motor housing and the powertrain mount distributes load associated with the components.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A drivetrain providing tractive torque to first and second wheel assemblies of a ground vehicle that includes an internal combustion engine including an oil pan, the drivetrain comprising a non-combustion torque machine coaxial to and rotatably coupled to an integrated gear set including a conjoined carrier assembly coupling a reducing gear set to a differential gear set, wherein the non-combustion torque machine includes a rotor member and a housing, said differential gear set being coaxial to and rotatably coupled to first and second differential axle members, said first differential axle member coupled to the first wheel assembly arranged on a first side of the ground vehicle and said second differential axle member coupled to the second wheel assembly arranged on a second, opposite side of the ground vehicle;

wherein the rotor member of the non-combustion torque machine is coupled to a tubular motor member coupled to an intermediate member rotatably coupled to a rotatable element of the integrated gear set;

wherein the tubular motor member, the intermediate member and the rotatable element of the integrated gear set are concentric to the first differential axle member coupled to the first wheel assembly;

wherein the intermediate member and the first differential axle member pass through a cylindrically-shaped hollow tube fabricated to pass from a first side to a second side of the oil pan; and wherein an inboard portion of the housing for the non-combustion torque machine is fabricated onto the first side of the oil pan.

2. The drivetrain of claim 1, wherein the integrated gear set including the conjoined carrier assembly coupling the reducing gear set to the differential gear set comprises the conjoined carrier assembly coaxial to the reducing gear set coaxial to the differential gear set.

3. The drivetrain of claim 1, further comprises an outboard portion of the housing of the non-combustion torque machine including a structural lug mechanically coupled to a support bracket of a powertrain mount.

4. The drivetrain of claim 1, further comprising an inboard portion of a housing for the integrated gear assembly fabricated onto the second side of the oil pan.

5. The drivetrain of claim 1, further comprising the non-combustion torque machine coaxial to and coupled to the integrated gear set oriented along an axis of rotation parallel to a transverse axis of the ground vehicle.

6. The drivetrain of claim 1, wherein the non-combustion torque machine comprises an electric motor/generator.

7. The drivetrain of claim 1, wherein the said differential gear set coaxial to and coupled to first and second differential axle members further comprises an inboard end of the second differential axle member formed with a hollow bore portion and an inboard end of the first differential axle member formed with a projecting portion inserted into a bearing inserted into the hollow bore portion of the second differential axle member.

8. A drivetrain providing tractive torque to first and second wheel assemblies of a ground vehicle that includes an internal combustion engine including an oil pan, the drivetrain comprising a non-combustion torque machine coaxial to and rotatably coupled to an integrated gear set including a conjoined carrier assembly coupling a reducing gear set to a differential gear set, wherein the non-combustion torque machine includes a rotor member and a housing, said differential gear set being coaxial to and rotatably coupled to first and second differential axle members, said first differential axle member coupled to the first wheel assembly arranged on a first side of the ground vehicle and said second differential axle member coupled to the second wheel assembly arranged on a second, opposite side of the ground vehicle;
   wherein the rotor member of the non-combustion torque machine is coupled to a tubular motor member coupled to an intermediate member rotatably coupled to a rotatable element of the integrated gear set;
   wherein the tubular motor member, the intermediate member and the rotatable element of the integrated gear set are concentric to the first differential axle member coupled to the first wheel assembly; and
   wherein the intermediate member and the first differential axle member pass through a cylindrically-shaped hollow tube fabricated to pass from a first side to a second side of the oil pan of the internal combustion engine.

9. A drivetrain providing tractive torque to a ground vehicle including an internal combustion engine, the drivetrain comprising:
   an electrically-powered motor/generator including a rotor coaxial to an integrated gear set and including an axis of rotation oriented parallel to a transverse axis of the ground vehicle;
      wherein the rotor is coupled to a tubular motor member coupled to an intermediate member coupled to an input member of a reducing gear set of the integrated gear set; and
   first and second differential axle shafts coupled to opposite rotatable elements of a differential gear set of the integrated gear set, wherein the first differential axle shaft is concentric with the rotor, the tubular motor member, the intermediate member and the input member of the reducing gear set;
   wherein the integrated gear set includes a coaxial conjoined carrier assembly coupling the reducing gear set and the differential gear set;
   wherein first differential axle shaft couples to a first wheel assembly of the ground vehicle;
   wherein the second differential axle shaft couples to a second wheel assembly of the ground vehicle; and
   wherein the first differential axle shaft and the intermediate member pass through a cylindrically-shaped hollow tube fabricated in an oil pan of the internal combustion engine.

10. The drivetrain of claim 9, further comprising an inboard portion of a housing for the electrically-powered motor/generator fabricated onto the first side of the oil pan.

11. The drivetrain of claim 9, further comprising an outboard portion of the housing of the electrically-powered motor/generator including a structural lug mechanically coupled to a support bracket of a powertrain mount.

12. The drivetrain of claim 9, further comprising an inboard portion of a housing for the integrated gear assembly fabricated onto the second side of the oil pan.

13. The drivetrain of claim 9, wherein the said differential gear set coaxial to and coupled to first and second differential axle members further comprises an inboard end of the second differential axle member formed with a hollow bore portion and an inboard end of the first differential axle member formed with a projecting portion inserted into a bearing inserted into the hollow bore portion of the second differential axle member.

14. The drivetrain of claim 9, wherein the internal combustion engine mounts longitudinally in a front engine, rear-wheel drive configuration in the ground vehicle.

15. The drivetrain of claim 9, wherein the electrically-powered motor/generator rotatably couples to the internal combustion engine.

16. A drivetrain providing tractive torque to a ground vehicle that include an internal combustion engine, the drivetrain comprising a non-combustion torque machine coupled to a reducing gear set coupled to a differential gear set, said differential gear set coupled to first and second differential axle members, said first differential axle member coupled to a first wheel assembly on a first side of the ground vehicle and said second differential axle member coupled to a second wheel assembly located on a second, opposite side of the ground vehicle;
   said non-combustion torque machine being mounted on a first side of an oil pan of the internal combustion engine;
   said differential gear set being mounted on a second, opposite side of the oil pan of the internal combustion engine; and
   said non-combustion torque machine, reducing gear set, differential gear set and first and second differential axle members being coupled via rotating members, wherein at least one of said rotating members passes through a cylindrically-shaped hollow tube fabricated in the oil pan of the internal combustion engine.

* * * * *